United States Patent [19]

Black, Jr. et al.

[11] Patent Number: 5,403,604
[45] Date of Patent: Apr. 4, 1995

[54] SUGAR SEPARATION FROM JUICES AND PRODUCT THEREOF

[75] Inventors: Hugh F. Black, Jr.; Ronald G. Bray, both of Buffalo Grove, Ill.

[73] Assignee: The Nutrasweet Company, Deerfield, Ill.

[21] Appl. No.: 37,738

[22] Filed: Mar. 26, 1993

Related U.S. Application Data

[63] Continuation of Ser. No. 776,925, Oct. 15, 1991, abandoned.

[51] Int. Cl.$^6$ .............................................. A23L 2/08
[52] U.S. Cl. ................................. 426/330.5; 426/490; 426/599; 426/616
[58] Field of Search ............... 426/616, 330.5, 490, 426/599

[56] References Cited

U.S. PATENT DOCUMENTS

| | | | |
|---|---|---|---|
| 4,332,448 | 3/1982 | Matsuura et al. | 426/490 |
| 4,432,806 | 2/1984 | Madsen et al. | 210/638 |
| 4,643,902 | 2/1987 | Lawhon et al. | 426/271 |
| 4,806,366 | 2/1989 | Dick et al. | 426/15 |
| 4,919,963 | 4/1990 | Heckert | 426/590 |
| 4,933,197 | 6/1990 | Walker et al. | 426/330.5 |
| 4,959,237 | 9/1990 | Walker | 426/330.5 |
| 5,049,402 | 9/1991 | Tamaki et al. | 426/599 |
| 5,108,774 | 4/1992 | Mills et al. | 426/599 |

FOREIGN PATENT DOCUMENTS

WP89/10703  11/1989  WIPO.

OTHER PUBLICATIONS

Kimball, et al., *J. Agric. Food Chem.*, "Processing Effects during Commercial Debittering of California Navel Oranges," 38(6):1396–1400 (1990).

Köseoglu, et al., *Food Technology*, "Use of Membranes in Citrus Juice Processing," pp. 90–97 (Dec. 1990).

Matthews, et al., *Food Technology*, "Removal of Limonin and Naringin from Citrus Juice by Styrene–Divinylbenzene Resins," pp. 130–132 (Apr. 1990).

Merson, et al., *Food Technology*, "Juice Concentration by Reverse Osmosis," 22:97–100 (May 1968).

Proctor & Gamble, *Other Foodstuffs*, "Abstract Diet Fruit Juices containing non-nutritive sweeteners with increased background pulp volume to reduce after-taste," D13, p.11, Week 9137.

Shomer, et al., *J. Food Science*, "Recovery of Citrus Cloud from Aqueous Peel Extract by Microfiltration," 49:991–994 (1984).

Primary Examiner—Helen Pratt
Attorney, Agent, or Firm—Marshall, O'Toole, Gerstein, Murray & Borun

[57] ABSTRACT

Sugar is separated from juices employing a membrane separation process that results in (i) a nutritious high Brix/acid (B/A) ratio juice fraction and (2) a low calorie, low B/A ratio content juice fraction. The low calorie juice fraction is sweetened with a high potency sweetener. The sugar separation process involves ultrafiltration, nanofiltration and optionally reverse osmosis techniques.

23 Claims, 2 Drawing Sheets

SUGAR SEPARATION FROM JUICES AND PRODUCT THEREOF

This is a Continuation of U.S. application Ser. No. 07/776,925, filed Oct. 15, 1991, now abandoned.

BACKGROUND OF THE INVENTION

The present invention relates to a process or separating sugars from juices. Ultra filtration, nanofiltration and reverse osmosis (RO) membranes are employed to form a nutritious high sugar juice fraction and a low sugar juice fraction that is a low-calorie beverage. The low sugar juice fraction can be sweetend with a high potency sweetener such as aspartame.

U.S. Pat. No. 4,643,902 discloses a process where juices are passed through an UF membrane (30,000–100,000 daltons) to collect high molecular weight enzymes and spoilage microorganisms in the retentate and pass flavor and aroma components into the permeate. The retentate is treated to deactivate the enzymes and kill the microorganisms. The so treated retentate is then recombined to form a good tasting storage stable juice.

U.S. Pat. No. 4,322,448 discloses a method for concentrating fruit juices by reverse osmosis. The juice is passed through a first RO cellulose acetate membrane. The permeate is then passed through a second polymeric membrane which is non-polar relative to the first membrane. The retentate portions from each RO step are collected to form a concentrated fruit juice.

U.S. Pat. No. 4,933,197 discloses a membrane process for producing a fruit juice with improved quality where fruit juice is passed through a series of UF membranes of decreasing pore size. The first membrane removes spoilage microorganisms. The claimed product is a storage stable clarified juice serum which is the combination of all of the UF permeates.

U.S. Pat. No. 4,806,366 discloses a process for adjusting the alcohol content of alcoholic beverages employing RO techniques. Permeates are recirculated in that process.

WO 89/10703 of Bucher-Guyer relates to a process for the selective removal of sugar from beverages. A membrane separation is conducted to concentrate undesired compounds (sugars, acid) either in the permeate or retentate. The undesired compounds are then removed from the permeate or retentate by physical, chemical or biotechnological methods. RO techniques are employed to concentrate the undesired compounds.

Kimball et al, *J. Agric Food Chem.*, Vol. 38, No. 6, 1990, disclose polymeric adsorbents for debittering California navel orange juice.

Matthews, et al., *Food Technology*, April, 1990, p. 130–132, disclose the removal of limonin and naringin from citrus juice by styrene-divinylbenzene resins.

Merson et al., *Food Technology*, Vol. 22, p. 631–634, disclose a juice concentration process using a reverse osmosis membrane filter.

Koseoglu et al, *Food Technology*, December, 1990, disclose the use of membrane technology to control enzymatic and microboal activity in juice processing as an alternative to traditional processing techniques. UF and reverse osmosis techniques are used to clarify, concentrate and sterilize juices.

Shomer et al, *J. Food Science*, Vol. 49, (1984) disclose UF processes for recovering citrus cloud from aqueous peel extract.

SUMMARY OF THE INVENTION

Briefly, in accordance with the present invention, fruit juice sugars are separated from fruit juice by a membrane separation process that results in a high sugar content juice that has an increased Brix/acid (B/A) ratio and a low sugar content juice that has a decreased B/A ratio. The high sugar content juice is a high-energy nutritious drink or can be added back to regular juices to adjust the sugar/acid ratio to a desired range. The low sugar content juice can be sweetened with a high potency sweetener and is a low-calorie juice. If desired, concentrates can be made from either juice product.

Fruit juice is passed through an ultrafiltration (UF) membrane to remove pulp, cloud and oils. The permeate is then passed through a nanofiltration (NF) membrane to remove fruit juice sugars. The NF retentate will contain a high level of fruit juice sugars and an increased B/A ratio compared to the starting juice. The NF permeate will contain lower levels of fruit juice sugars and a lower B/A ratio compared to the starting juice. The UF retentate is then added back to the NF retentate and NF permeate resulting in the formation of a high B/A ratio juice fraction and a low B/A ratio juice fraction. High potency sweeteners, such as aspartame, are added to the low B/A juice fraction to make a sweetened low-calorie juice.

DETAILED DESCRIPTION OF THE INVENTION

Figure 1:
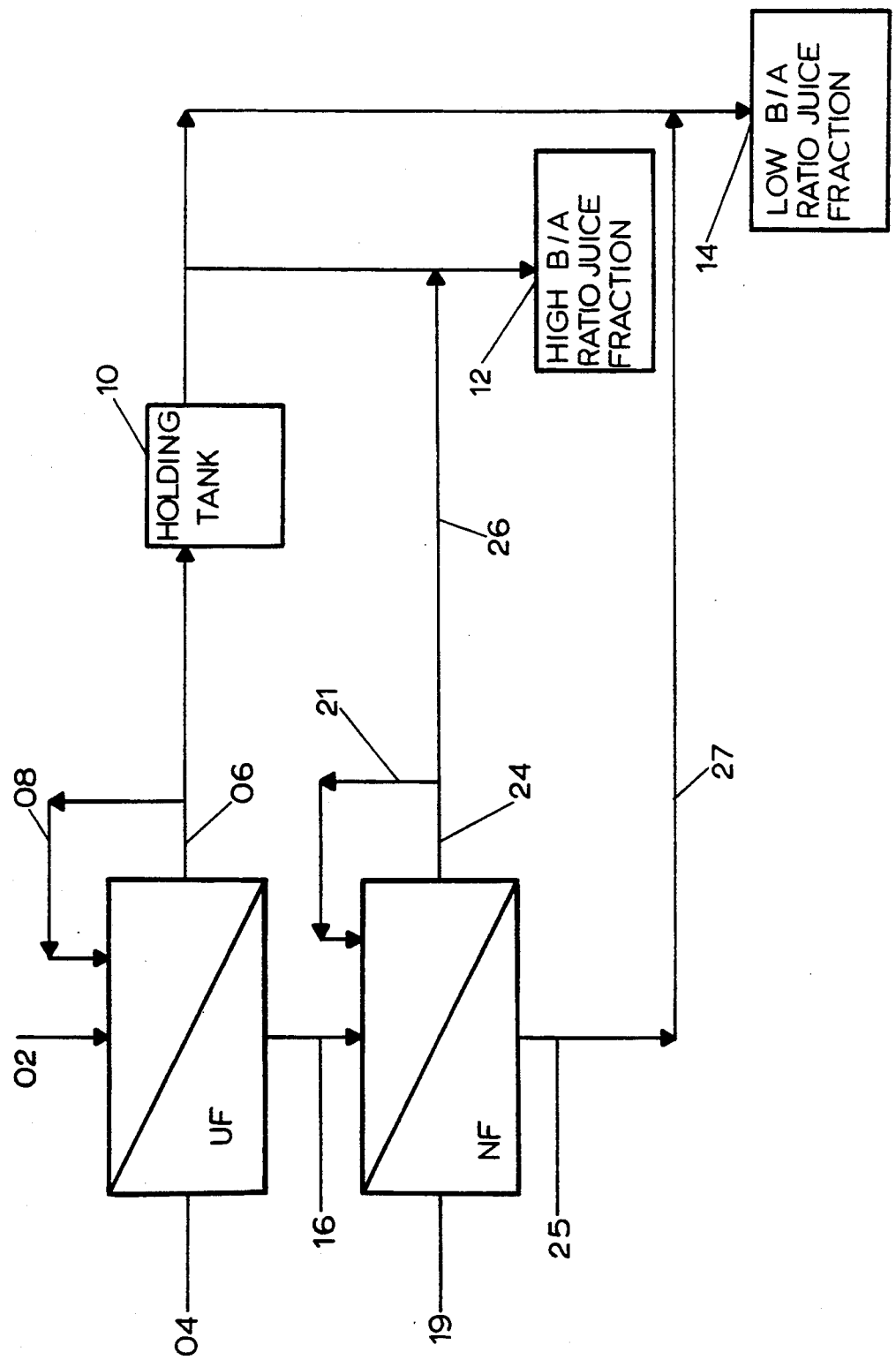
FIG. 1 is a process flow diagram of one embodiment of the present sugar separation process.

In practicing the present invention, fruit juice is obtained from a fruit where it is desired to have a low sugar juice fraction and a high sugar juice fraction. Suitable fruits include citrus fruits such as oranges, grapefruit, lemons and limes; apples, grapes, mangos, papaya, pears, peaches, apricots, pineapples, strawberries, rasberries, currants, blueberries and the like. A preferred fruit juice is orange juice.

The fruit juice can be used "as is" after extraction from the fruit or it can be a finished juice which has been preliminarily filtered to remove seeds, pulp and miscellaneous solids. The fruit juice can also be reconstituted from a juice concentrate. Use of a finished fruit juice will allow for a more efficient ultrafiltration process because the filters will not clog as quickly.

The filtration membranes employed in the practice of the present invention are standard filtration units well known to one skilled in the art. The membrane can be of any standard composition such as a polysulfone, a fluoropolymer, cellulose acetate or the like. The ultrafiltration membranes will have a pore size of up to 1,000 Angstroms ($1\mu$) which corresponds to a molecular weight cut off (MWCO) of about 100,000. UF membranes can have a pore size as low as about 30 Angstroms (MWCO~2,000). Nanofiltration (NF) membranes overlap reverse osmosis (RO) and UF membranes with respect to pore size. NF membranes can have a pore size of from about 8–100 Angstroms which corresponds to a MWCO fo from about 100-20,000. RO or hyperfiltration membranes usually have a pore size of from about 1-20 Angstroms and have a MWCO under about 200. See "The Filtration Spectrum", Osmonics, Inc., Minnetonka, Minn., copyright 1990, 1984, which is incorporated herein by reference.

The term "Brix" when used herein refers to weight percent of total soluble solids in a fruit juice composition or process stream. The Brix value will be within a few percent of the sugar content in weight percent because sugars (sucrose, fructose and glucose) usually represent in excess of 95% by weight of the soluble solids.

In practicing the present invention, a fruit juice is passed through a UF membrane (MWCO 2,000-100,000) resulting in a UF retentate and a UF permeate. The UF retentate is comprised primarily of water, cloud components, pulp, oil soluble flavors and oil soluble colors. The UF retentate is set aside and recombined with the low sugar content and high sugar content streams further on in the process. The UF membrane should pass most of the water, sugars, citric acid, ascorbic acid, minerals, water soluble components and peel components into the UF permeate.

The UF permeate is collected and passed through a NF membrane (MWCO 500-20,000) to form a high sugar content NF retentate that has an increased B/A ratio compared to the starting juice and a low sugar content NF permeate that has a reduced B/A ratio compared to the starting juice. The NF membrane will retain a major portion of the sucrose, Ca, Mg, bitter peel components, including, depending on the juice, hesperidin, limonin and naringin, and brown components. The NF retentate is optionally treated to remove bitter peel and brown components such as, for example, contacting the NF retentate with a polymeric adsorption resin. Commercial adsorption resins useful for this purpose include styrene divinylbenzene resins and are available from The Dow Chemical Company, Midland, Mich., and Rohm and Haas Co., Philadelphia, Pa. The NF retentate is then recombined with the UF retentate and optionally water to form a high B/A ratio fruit juice fraction. The water content of the high B/A ratio fraction is adjusted so that the juice fraction is substantially identical to the original fruit juice except that it will contain a higher sucrose content, typically about 50% or more than the original juice. For example, a 12 Brix orange juice will result in a high sugar juice fraction having a Brix of about 18 while maintaining the same acid content.

The NF membrane should pass a major portion of the water, citric acid, K, Na, water soluble flavors and ascorbic acid. Some sugars usually will pass through the membrane into the NF permeate. The NF permeate is then recombined with the UF retentate to form a low B/A ratio fruit juice fraction. The water content of the low B/A ratio fraction is adjusted so that the juice fraction is substantially identical to the original fruit juice except that it will contain a lower sucrose content, typically about 50% or less than the original juice. For example, a 12 Brix orange juice will result in a low sugar juice fraction having a Brix of about 6 while maintaining about the same acid content.

Optionally, the NF permeate is further passed through an RO membrane to remove water. The RO permeate (water) can be disposed of but preferably is recirculated to any other process stream to adjust the water content if desired.

The temperature at which the present separation processes are conducted is not critical. However, elevated temperatures are preferred because higher temperatures improve the flux rate. Preferred temperatures are between 80° and 100° F.

Referring to FIG. 1, a finished fruit juice is pumped 02 to a UF unit 04 that has a UF membrane with an MWCO of about 20,000. The UF retentate 06 is optionally recirculated 08 to the UF unit 04 but preferably is pumped to a holding tank 10 where it is later pumped and mixed with (a) the NF retentate 24 to form the high B/A ratio juice fraction 12 or (b) the NF permeate 25 to form the low B/A ratio juice fraction 14. The UF permeate 16 is pumped to an NF unit 19 having an NF membrane with an MWCO of about 500. The NF retentate 24 is optionally recirculated 21 back to the NF unit 19 but is preferably pumped and mixed 26 with the UF retentate 06 to form the high B/A ratio juice fraction 12. The NF permeate 25 is pumped and mixed 27 with the UF retentate 06 to form the low B/A ratio juice fraction 14 which is sweetened with one or more high potency sweeteners. Water can be added at any point in the process to dilute any stream if desired. Also, any stream can be concentrated, if desired, by employing standard well known technology, such as, for example, RO, freeze concentration and evaporation.

Figure 2:
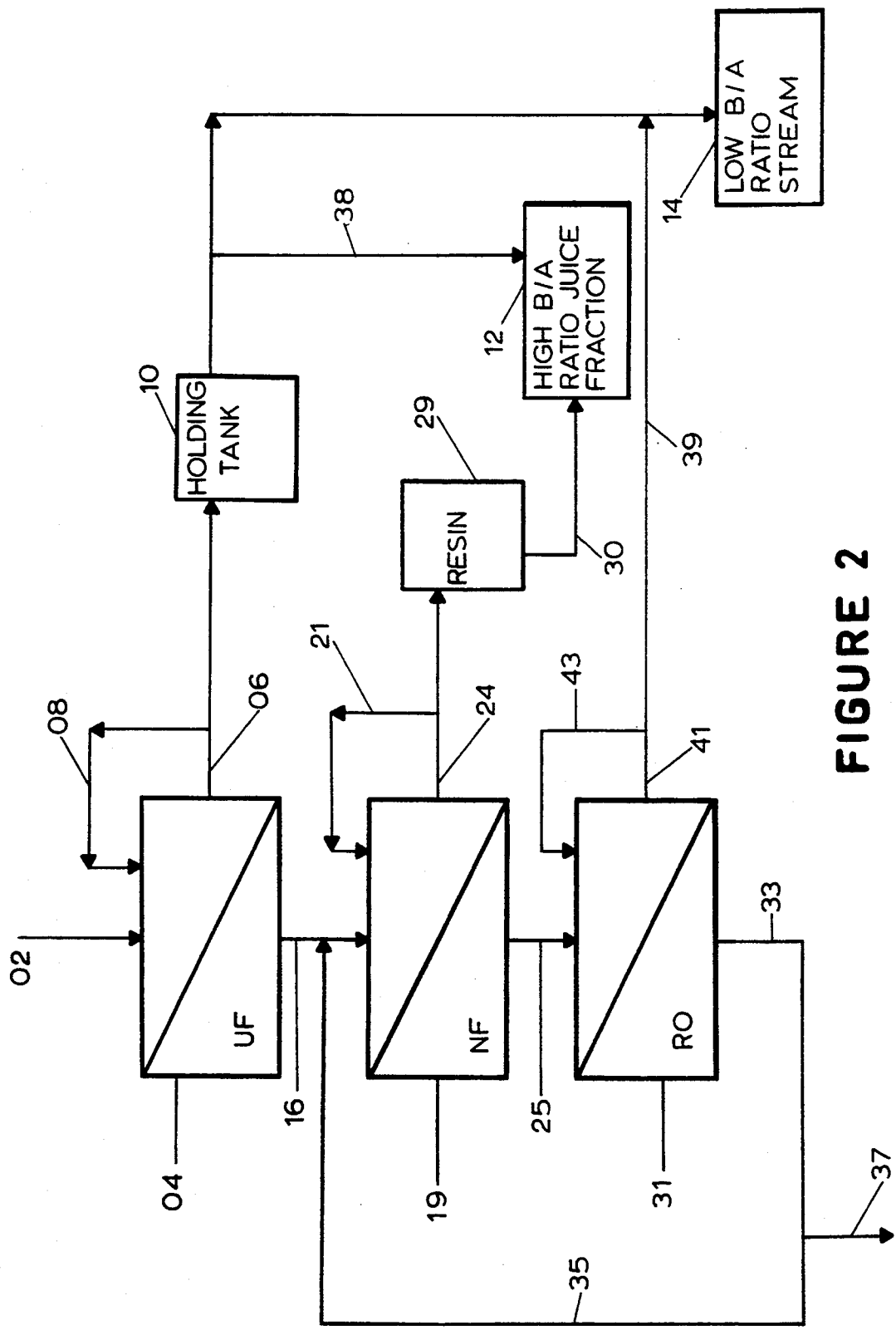
FIG. 2 is a process flow diagram of the present sugar separation process which includes a resin treatment step to remove bitter peel and brown components and a reverse osmosis treatment step of the nanofiltration permeate.

Referring to FIG. 2, a finished orange juice (OJ) having a Brix of about 12 and an acid content of about 0.8% by wt is pumped 02 to a UF unit 04 that is equipped with a UF membrane with an MWCO of about 20,000. The UF retentate 06 is optionally recirculated 08 to the UF unit 04 but is preferably pumped to a holding tank 10 where it is later pumped and mixed with (a) the NF retentate 24 to form the high B/A ratio juice fraction 12 or (b) the RO retentate 41 to form the low B/A ratio juice fraction 14. The UF permeate 16 is pumped to an NF unit 19 having an NF membrane with an MWCO of about 500. The NF retentate 24 is optionally recirculated 21 back to the NF unit 19 but is preferably pumped to an adsorption resin unit 29 where bitter peel components (hesperidin, limonene, naringin, etc.) and brown components are removed. The treated stream 30 is then pumped and mixed 38 with the UF retentate 06 to form the high B/A ratio juice product 12. The NF permeate 25 is pumped to an RO unit 31 where it is concentrated by the removal of water. The RO permeate 33 can be recirculated to any other stream in the process. For example, it can be recirculated 35 back to the NF unit 19. Alternately, the RO permeate 33 can be disposed of through proper disposal means 37. The RO retentate 41 is optionally recirculated 43 to the RO unit 31 but is preferably pumped and mixed 39 with the UF retentate 06 to form the low B/A ratio OJ fraction 14 which can be sweetened with one or more high potency sweeteners.

In typical operations for OJ, the incoming finished juice will have a Brix of about 12 and an acid content of 0.8 wt %. The high B/A juice fraction will usually have a Brix of about 18 or more and the low B/A juice fraction will have a Brix of about 6 or less. The acid content of both fractions preferably are about 0.8 wt % (the same as the finished juice), but can be lower or higher if desired by employing an NF membrane which controls the acid permeability according to the desired result.

The low B/A ratio juice fractions of the present invention are sweetened with low calorie or high potency sweeteners to a level of sweetness that is desired. Typically, for OJ, the low B/A OJ fraction is sweetened to a level that is comparable to level of sweetness of natural juice, i.e., about 12 Brix. The amount of sweetener employed will vary depending on a variety of factors, such as, for example, the particular fruit juice employed, the particular sweetener(s) employed, the acid content of the juice fraction, the particular segment of the population the juice fraction is being marketed to, any other flavors that may be added and so on. The preferred amount of sweetener to be added in a given application is readily determined by one skilled in the art by conducting sensory evaluations over a range of sweetener levels. Aspartame is usually added at a level of from about 100 to about 500 parts per million (ppm) and preferably at a level of about 300 ppm.

The high B/A ratio juice fraction of the present invention can be sold as a nutritious high energy drink, i.e. sports drink, or it can be employed as a sugar/acid modifier which is blended with juices to modify the B/A ratio to desired levels. It can also be sold as a low acid fruit juice.

The following example illustrates the practice of the present invention, but should not be construed as limiting its scope.

EXAMPLE

UF Run

A 65 degree Brix orange concentrate was diluted to single strength with RO water. 70 kg of juice was clarified in a DDS lab stack UF unit with 8 plates containing the DDS 36GR61PP membranes. The molecular weight cut off (MWCO) was 20,000 daltons. Filter was run at 3 bar pressure at 85 degree F.

|  | Weight | Brix | Acid | Ratio |
| --- | --- | --- | --- | --- |
| Incoming Juice | 70 kg | 11.8 | 0.79% | 15 |
| UF Retentate | 16.2 kg* | 14.9 | 0.87% | 17.1 |
| UF Permeate | 61.5 kg | 9.5 | 0.67% | 14.2 |

*Calculated weight
note 7.7 kg of water was picked up in the filter.
Flux rate of the unit at start: 265 ml per min.
Flux rate at end of run: 130 ml per min.

NF Run

A Millipore Pro Lab with a Milipore SK2P472E5 cartridge was used for the separation of sugars from acid. The unit was operated at a trans-membrane pressure of 500 psi. The membrane had a MWCO of 500 daltons.

|  | Weight | Brix | Acid | Ratio |
| --- | --- | --- | --- | --- |
| UF Permeate | 29.2 kg | 9.5 | 0.67% | 14.1 |
| NF Retentate | 12.9 kg* | 20.6 | 1.25% | 16.5 |
| NF Permeate | 16.0 kg | 0.7 | 0.22% | 3.2 |

*Calculated Result
The NF retentate is the high sugar stream.
The flux rate at 9.5 Brix was 215 ml per min.
The flux rate at 20 Brix was 80 ml per min.

RO Run

The same Millipore unit was used. The cartridge was changed to the Millipore #SK2P473E5 polyamide reverse osmoses element. The filter was operated at 500 psi.

|  | Weight | Brix | Acid | Ratio |
| --- | --- | --- | --- | --- |
| NF Permeate | 13.5 kg | 0.7 | 0.22% | 3.2 |
| RO Retentate | 1.4 kg* | 7.8 | 2.15% | 3.3 |
| RO Permeate | 12.2 kg | 0.0 | 0.0 | 0 |

*Calculated Result
The RO Retentate is the low sugar stream.

Low B/A Ratio Juice

A low B/A ratio juice was formulated as follows:

|  | Weight | Soluble Solids | Citric Acid |
| --- | --- | --- | --- |
| UF Retentate | 122 g | 18.2 g | 0.96 g |
| Low Sugar stream | 323 g | 25.1 | 6.94 g |
| Water | 555 g | 0 | 0 |
| Total | 1,000 g | 43.3 g | 7.9 g |

Brix: 4.3 degree
Acid: 0.8% wt./wt.
Ratio: 5.4

High B/A Ratio Juice

A high B/A ratio juice was formulated as follows:

|  | Weight | Soluble Solids | Citric Acid |
| --- | --- | --- | --- |
| UF Retentate | 122 | 18.2 | 0.96 |
| High Sugar stream | 555.2 | 114.4 | 6.94 |
| Water | 322.8 | 0 | 0 |
| Total | 1000 g | 132.6 g | 7.9 g |

Brix: 14.2 degree
Acid: 0.79% wt./wt.
Ratio: 18.0

Analysis

The Starting orange juice, high B/A ratio juice and the low B/A ratio juice were analyzed. The results follow:

|  | Starting Juice | Low-Sugar Juice | High Sugar Juice | RSK VALUES* | | | |
| --- | --- | --- | --- | --- | --- | --- | --- |
|  |  |  |  | Guide Value | Range From | To | Central Value |
| Brix | 11.8 | 4.3 | 14.2 | 11.18 | 11.18 | 13.54 | 11.4 |
| % Total Acid | 0.79 | 0.79 | 0.79 |  |  |  |  |
| % Glucose | 2.2 | 0.86 | 2.9 | 2.2 | 2.8 | — | 2.8 |
| % Fructose | 2.5 | 0.93 | 2.6 | 2.4 | 2.2 | — | 3.0 |
| % Sucrose | 4.7 | 0.84 | 5.5 | 4.5 | — | 4.7 | 3.3 |
| % Ash | 0.37 | 0.25 | 0.36 | 0.35 | 0.29 | 0.48 | 0.40 |
| Calcium mg/100 g | 10 | 1.7 | 12 | 11 max. | 6 | 12 | 8 |
| Potassium mg/100 g | 192 | 135 | 187 | 170 min | 140 | 230 | 190 |
| % Pulp | 11 | 5 | 7 | 10 | 3 | 16 | — |
| Hesperidin ppm | 40 | 18 | 55 | 100 max. | — | — | — |

| | Starting Juice | Low-Sugar Juice | High Sugar Juice | RSK VALUES* | | | |
|---|---|---|---|---|---|---|---|
| | | | | Guide Value | Range From | Range To | Central Value |
| Pectin mg GA/l | 233 | 183 | 205 | — | — | — | — |
| Oxalate Soluble | 17 | 17 | 24 | — | — | — | — |
| Alkali Soluble | 120 | 100 | 105 | — | — | — | — |
| Water Soluble | 95 | 65 | 78 | 500 max | — | — | — |
| Vitamin C mg/100 g | 32 | 39 | 26 | 20 min | — | — | 35 |
| Formal No. ME/100 ml | 2.4 | 0.96 | 2.8 | 1.8 | 1.5 | 2.6 | 2.0 |
| Proline mg/l | 1150 | 500 | 1420 | 575 | 450 | 1300 | 800 |

*RSK value obtained from RSK-Values, The Complete Manual, Association of the German Fruit Juice Industry, 1 Edition 1987.

In similar operations containing the various juices and process conditions described herein high B/A juice fractions and low B/A juice fractions are prepared.

We claim:

1. A process for separating sugars from a fruit juice to form a high Brix/acid (B/A) ratio fruit juice fraction and a low Brix/acid (B/A) ratio fruit juice fraction which comprises:
   (a) passing a fruit juice through an ultrafiltration (UF) membrane to form:
      (i) a UF retentate comprising water, cloud, oil soluble flavors, oil soluble colors and pulp, and
      (ii) an UF permeate;
   (b) passing the UF permeate from step (a) through a nanofiltration (NF) membrane that has a low permeability to fruit juice sugars to form
      (i) an NF retentate having a high sugar content and
      (ii) an NF permeate having a low sugar content;
   (c) optionally concentrating the NF permeate to remove water:
   (d) optionally recirculating the removed water from step (c) to any other step in said process;
   (e) adding a portion of the UF retentate from step (a) to the high sugar content NF retentate of step (b) to form a high B/A ratio fruit juice fraction; and
   (f) adding a portion of the UF retentate from step (a) to the low sugar content NF permeate of step (b) or to the concentrated low sugar content composition of step (c) to form a low B/A ratio fruit juice fraction whereby the high B/A ratio fruit juice fraction and the low B/A ratio fruit juice fraction resemble natural fresh juice with the major exception of the sugar content.

2. The process of claim 1 wherein the concentration step (c) is conducted by passing the low sugar content NF permeate through a reverse osmosis membrane to remove water and form:
   (i) an RO retentate; and
   (ii) a substantially pure water RO permeate.

3. The process of claim 1 further comprising the step of:
   contacting the high sugar content NF retentate of step (b) with an effective amount of an adsorbent resin under conditions sufficient to remove bitter peel and brown components.

4. The process of claim 1 wherein the ultrafiltration membrane has a molecular weight cut off (MWCO) of from about 2,000 to about 100,000 daltons.

5. The process of claim 4 wherein the ultrafiltration membrane has a MWCO of about 20,000 daltons.

6. The process of claim 1 wherein the nanofiltration membrane has a MWCO of from about 300 to about 20,000 daltons.

7. The process of claim 6 wherein the nanofiltration membrane has a MWCO of about 500 daltons.

8. The process of claim 2 wherein the reverse osmosis membrane is a polysulfone membrane.

9. The process of claim 1 wherein the ultrafiltration membrane is a polysulfone, a polyolefin or a fluoropolymer.

10. The process of claim 1 further comprising the step of adding a high potency sweetener to the low B/A ratio fruit juice fraction in an amount effective to sweeten the low B/A ratio juice fraction.

11. The process of claim 10 wherein the high potency sweetener is aspartame, acesulfame-K, sucralose, alitame, saccharin, cyclamate or mixtures thereof.

12. A process of making a low B/A ratio fruit juice composition which comprises:
   (a) passing a fruit juice through an ultrafiltration membrane to form:
      (i) an UF retentate comprising cloud, water, oil soluble flavors, oil soluble colors and pulp and
      (ii) an UF permeate;
   (b) passing the UF permeate from step (a) through a nanofiltration membrane that has a low permeability to fruit juice sugars to remove sugars from the UF permeate resulting in
      (i) a high sugar content NF retentate and
      (ii) a low sugar content NF permeate;
   (c) optionally concentrating the low sugar content NF permeate of step (b) to remove water; and
   (d) adding all or a portion of the UF retentate of step (a) to the low sugar content NF permeate of step (b) or the water reduced composition of step (c) to form a low B/A ratio fruit juice composition.

13. The process claim 12 further comprising the step of adding a high potency sweetener to the low B/A ratio fruit juice composition of step (d) in an amount effective to sweeten the low B/A ratio fruit juice composition.

14. The process of claim 13 wherein the high potency sweetener is aspartame, acesulfame-K, sucralose, alitame, saccharin, cyclamate or mixtures thereof.

15. The process of claim 12 wherein the concentration step (c) is conducted by passing the low sugar content NF permeate through a reverse osmosis membrane.

16. The process of claim 12 wherein the low B/A ratio fruit juice composition has a Brix of about 6 or less and an acid content of about 0.8 weight percent.

17. The process of claim 12 wherein the ultrafiltration membrane:
   (i) is a polysulfone, a polyolefin or a fluoropolymer membrane and
   (ii) has a MWCO of 2,000–100,000 daltons.

18. The process of claim 15 wherein the reverse osmosis membrane is a polysufone membrane.

19. A sweetened low B/A ratio fruit juice composition which comprises:

(a) a high potency sweetener or a mixture of high potency sweeteners in an amount effective to sweeten said composition and (b) a low B/A ratio fruit juice wherein the fruit juice sugars have been reduced by a membrane separation process wherein the fruit juice retains substantially all of the characteristics of natural juice with the exception that the sugar content is reduced by at least about 50 percent.

20. The composition of claim 19 wherein the high potency sweetener is aspartame, acesulfame-K, sucralose, alitame, sacharin, cyclamates or mixtures thereof.

21. The process as in any one of claims 1–18 wherein the juice is orange juice.

22. The composition of claims 19 wherein the fruit juice is orange juice.

23. The composition of claim 20 wherein the fruit juice is orange juice.

* * * * *